(12) United States Patent
Hansen et al.

(10) Patent No.: US 8,401,688 B2
(45) Date of Patent: Mar. 19, 2013

(54) IDENTIFICATION OF ENGINEERING INTENT REQUIREMENTS IN AN ELECTRONIC ENVIRONMENT

(75) Inventors: Allan M. Hansen, Glencoe, MO (US); Bradley K. Jackson, Florissant, MO (US); Lawrence W. Rogers, Kenmore, WA (US); Scott A. Schieferdecker, O'Fallon, MO (US); David W. Patterson, Lynnwood, WA (US); Philip H. Farcy, Ashford, WA (US); Carl E. Bouffiou, Tacoma, WA (US); Jerry D. Zayic, Renton, WA (US)

(73) Assignee: The Boeing Company, Chicago, IL (US)

( * ) Notice: Subject to any disclaimer, the term of this patent is extended or adjusted under 35 U.S.C. 154(b) by 131 days.

(21) Appl. No.: 12/344,636

(22) Filed: Dec. 29, 2008

(65) Prior Publication Data
US 2009/0171490 A1 Jul. 2, 2009

Related U.S. Application Data

(63) Continuation-in-part of application No. 10/788,048, filed on Feb. 26, 2004, now Pat. No. 7,471,989.

(51) Int. Cl.
*G06F 19/00* (2011.01)
(52) U.S. Cl. .......... 700/107; 700/97; 700/104; 700/105; 717/104
(58) Field of Classification Search .......... 700/97, 700/98, 103; 707/2, 10, 100, 104; 717/100, 717/104
See application file for complete search history.

(56) References Cited

U.S. PATENT DOCUMENTS

| | | | | |
|---|---|---|---|---|
| 5,333,237 A | * | 7/1994 | Stefanopoulos et al. | 706/11 |
| 6,405,211 B1 | * | 6/2002 | Sokol et al. | 707/754 |
| 6,438,535 B1 | * | 8/2002 | Benjamin et al. | 707/3 |
| 6,658,428 B2 | * | 12/2003 | Sokol et al. | 1/1 |
| 6,871,108 B2 | * | 3/2005 | Carlucci et al. | 700/98 |
| 7,321,804 B2 | * | 1/2008 | Zayic et al. | 700/107 |

OTHER PUBLICATIONS

"Using Callouts and Autoshapes in FrontPage 2002", FrontPage 2003 Tutorial, printed from http://www.webworksite.com/callouts.shtml, Mar. 28, 2007.*
"Hyperlinked callouts to autocad" message board thread from http://forums.augi.com/showthread.php?t=704 Jul. 17, 2003.*
"How about a Shout Out for Callouts", Aubin et al, AutoDesk University 2004, Nov. 30, 2004.*

* cited by examiner

*Primary Examiner* — Michael D Masinick

(57) ABSTRACT

Engineering requirements are defined in an electronic environment. In one embodiment, a method includes providing at least one of a set of master requirements and a set of version requirements to be applied to the electronic product definition, and referencing an electronic reference document from at least one of the set of master requirements and the set of version requirements, the electronic reference document including one or more particular engineering requirements to be applied to the electronic product definition. Alternately, a method includes defining a callout linked to the at least one of the set of master requirements and the set of version requirements, the callout being adapted to supersede a conflicting engineering requirement set forth in at least one of the set of master requirements and the set of version requirements.

15 Claims, 10 Drawing Sheets

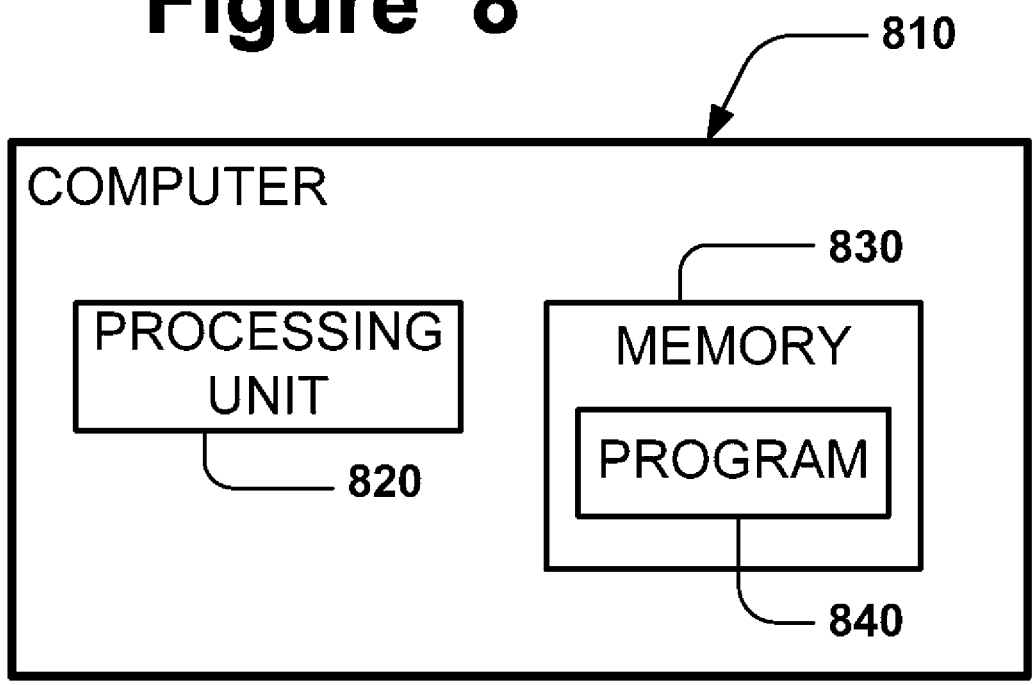

IDENTIFICATION OF ENGINEERING INTENT REQUIREMENTS IN AN ELECTRONIC ENVIRONMENT

FIELD

Embodiments herein relate to defining engineering requirements in a product definition, and more specifically, to identification of engineering intent requirements in an electronic environment.

BACKGROUND

As industry moves from paper drawing definition of products to computer model definition, the need to represent engineering intent associated to the product components is critical for the users of the product information. This information has traditionally been placed on the face of the drawing as specific information callouts (e.g. dimensions, tolerances, notes, etc.). These engineering requirements need to be associated and available with the design model and related appropriately to the product. Users of the engineering definition need to have access to this engineering intent information independently from the physical models. For example, engineering intent information such as surface finish requires specific process planning for manufacturing, and specific instructions for quality inspection. An explicit callout of these engineering intent requirements provides this independent access and configuration control.

For example, FIG. 1 is a schematic view of a set of engineering intent requirements for a product 100 in accordance with the prior art. Explicit callouts for various engineering intent requirements are shown in FIG. 1, including a hole class specification 102, a dimensional callout 104, one or more surface finish specifications 106, one or more manufacturing operation callouts 108, and a material specification 110. Of course, a variety of alternate engineering intent requirements may be conceived.

Although desirable results have been achieved using the prior art method of expressing engineering intent requirements, in the modern day practice of electronic design and modeling of products, there is room for improvement. Specifically, the prior art method of providing explicit callouts on engineering drawings may be inefficient, unwieldy, and impractical as product definition moves away from engineering drawings toward product modeling in an electronic environment.

SUMMARY

Embodiments herein may advantageously provide engineering intent requirements in an electronic environment in an orderly and logical hierarchy, thereby providing efficient and flexible definition of engineering requirements for electronically-modeled products.

In one embodiment, a system for creating an electronic product definition includes a computer programmed to provide electronic engineering intent requirements including a set of master requirements and a set of version requirements to be applied to the electronic product definition. The computer is further programmed to create a plurality of engineering requirement callouts that link locations of electronic reference documents to the set of master requirements and the set of version requirements. The electronic reference documents include particular engineering requirements to be applied to the electronic product definition.

In another embodiment, a system comprises at least one computer for creating an electronic definition of a product. The at least one computer provides at least one callout linked to an electronic engineering intent requirement on the product so a downstream process using the electronic product definition can link to, access and possibly modify the requirements in order to fulfill manufacturing of the product.

BRIEF DESCRIPTION OF THE DRAWINGS

FIG. 8 is an illustration of a computer according to an embodiment herein.

DETAILED DESCRIPTION

The embodiments herein relate to defining engineering intent requirements in an electronic environment. In brief, the embodiments herein may advantageously provide engineering intent requirements in an electronic environment, including, for example, indicating characteristics of engineering requirements, objects, and relationships for the development and production of products. As used herein, an engineering intent requirement is reusable information used in conveying the constraints of an engineering design, such as, for example, as part of the technical information that was traditionally portrayed on engineering drawings through annotations, within traditional parts lists as notes, and by other traditional means.

Figure 1:
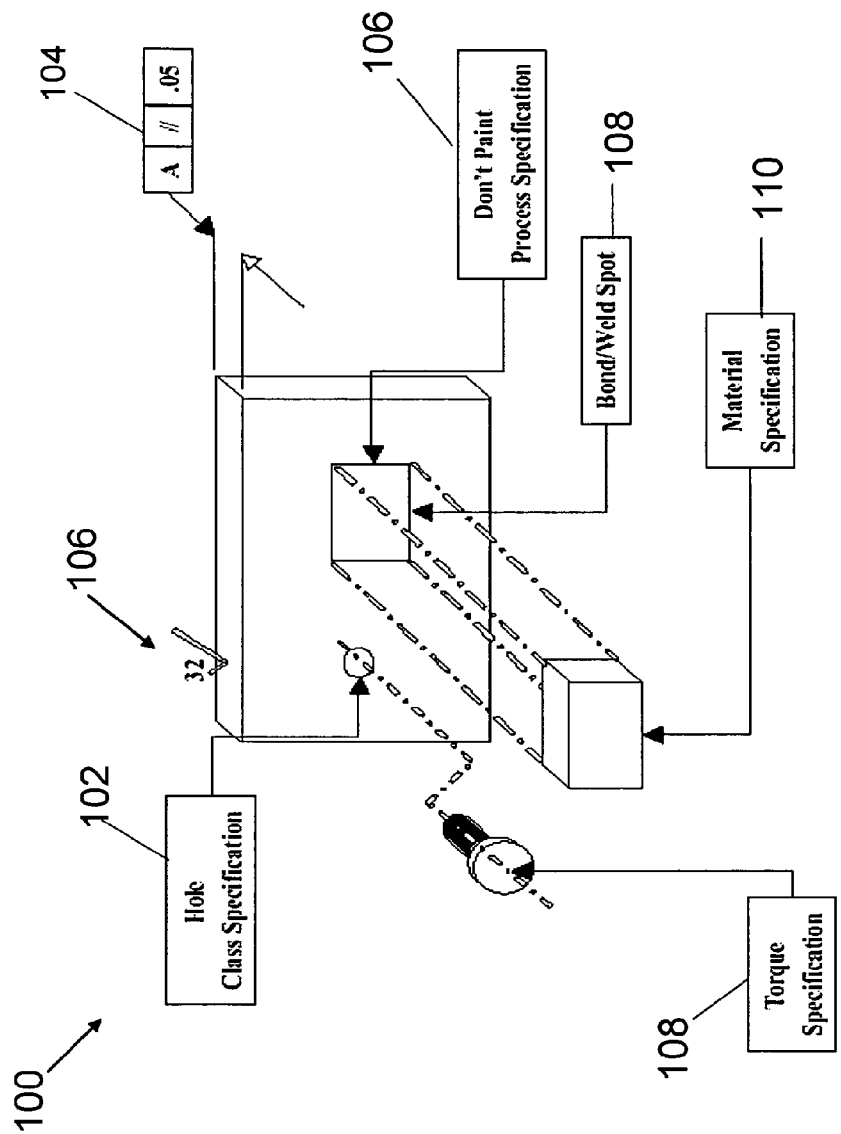
FIG. 1 is a schematic view of a set of engineering intent requirements for a product in accordance with the prior art.
Figure 2:
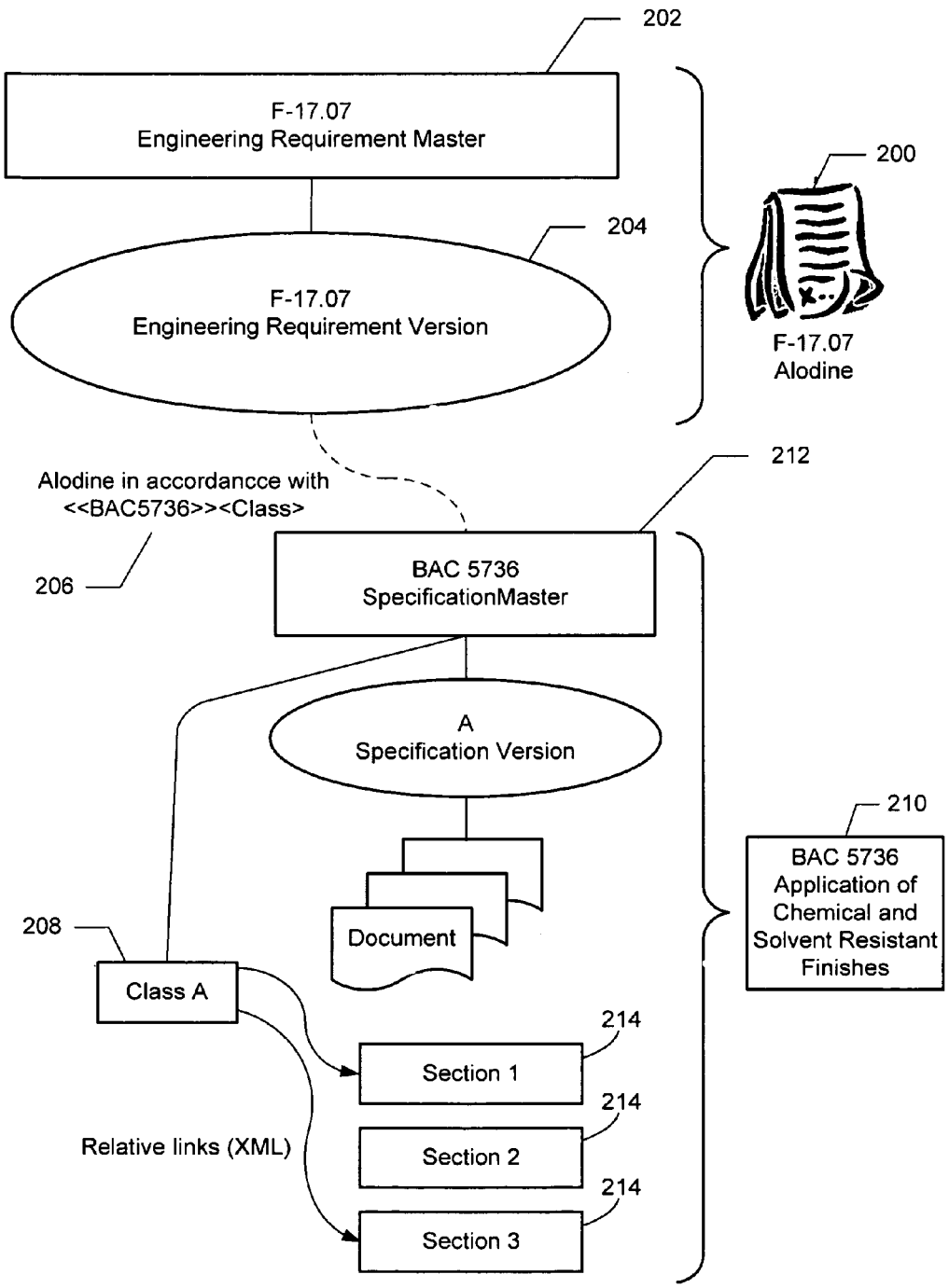
FIG. 2 is a schematic view of a set of electronic engineering intent requirements in accordance with an embodiment herein.

FIG. 2 is a schematic view of a set of electronic engineering intent requirements 200 in accordance with an embodiment herein. In this embodiment, the set of electronic engineering intent requirements 200 is composed of an engineering requirement master 202 and an engineering requirement version 204. The engineering requirement version 204 contains text qualifying the requirement, and references an electronic document 212 that defines an approved process for accomplishing the requirement, such as, for example, manufacturing processes, material specifications, etc.

In one particular embodiment, for example, the engineering requirement version 204 may reference a standardized metal finishing process, such as "Alodine in accordance with BAC5736 Class A" 206. In this representative example, the statement to "Alodine" is the requirement for the part, the requirement then references the document (BAC5736) 212 and a qualification (Class A) 208 within the document 212. The reference within the engineering requirement may be made to a general document location 210 (e.g. an electronic address or suitable location identifier). A user may then search the document to find the information that is pertinent to the respective engineering requirement 214.

Figure 6:
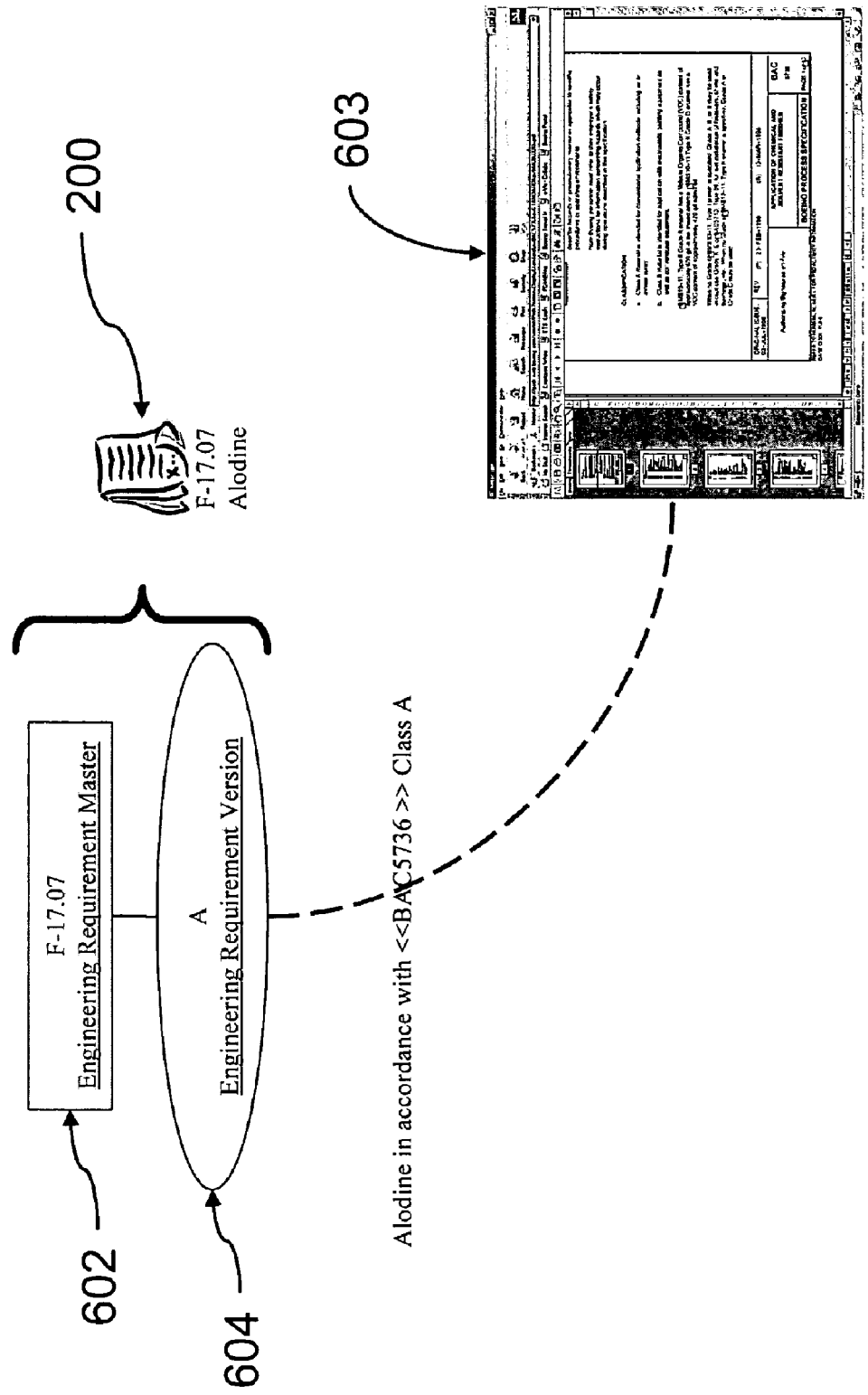
FIG. 6 is a schematic view of a set of electronic engineering intent requirements in the case of a reference to an external document in accordance with another embodiment herein.

FIG. 6 is a schematic view of a set of electronic engineering intent requirements 200 composed of an engineering requirement master 602 and an engineering requirement version 604 in the case of a reference to an external document 603.

Figure 3A:
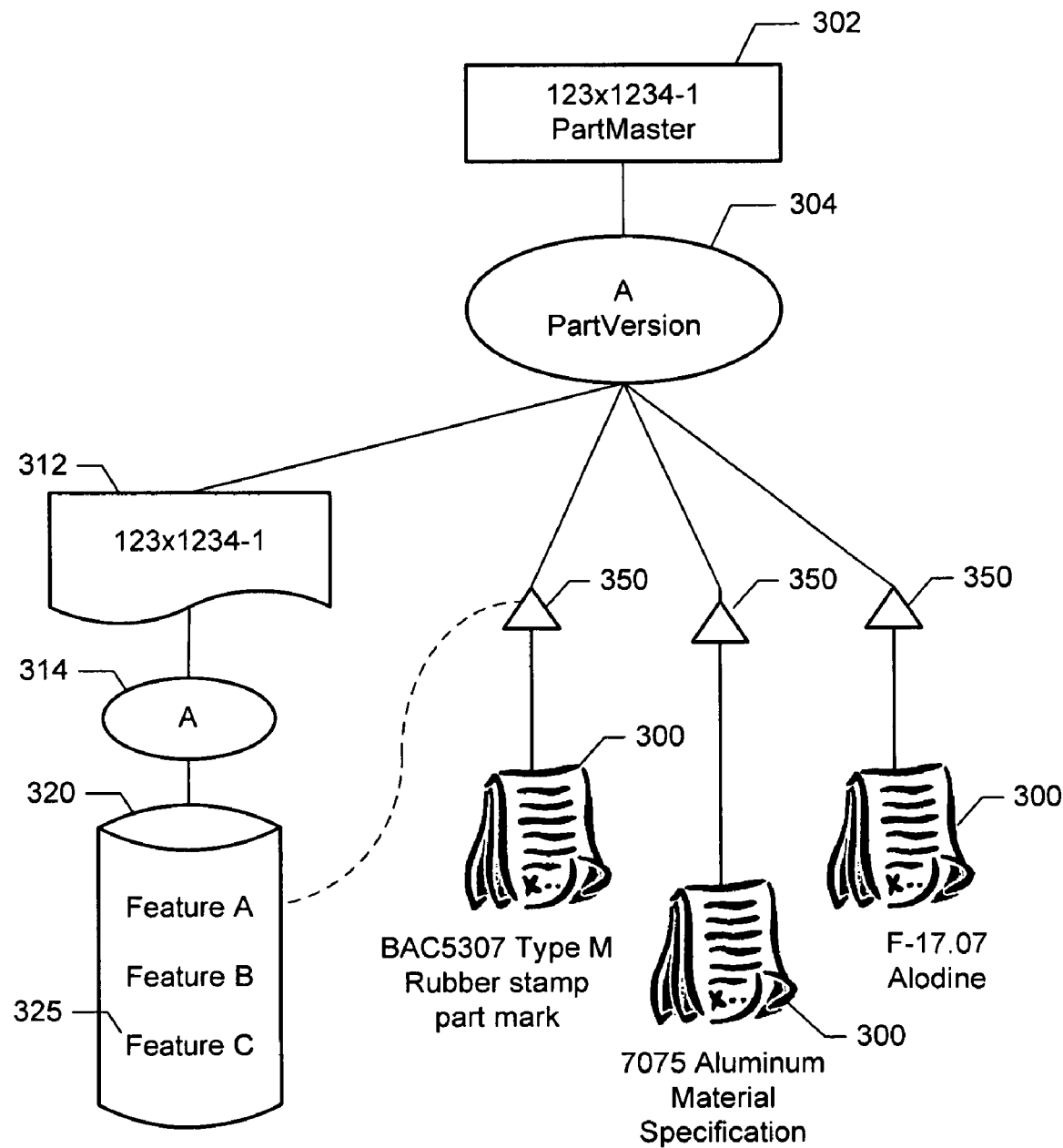
FIGS. 3A through 3C are schematic views of a set of engineering requirement callouts for detail structures, assembly structures, and product structures, respectively, in accordance with alternate embodiments herein.
Figure 3B:
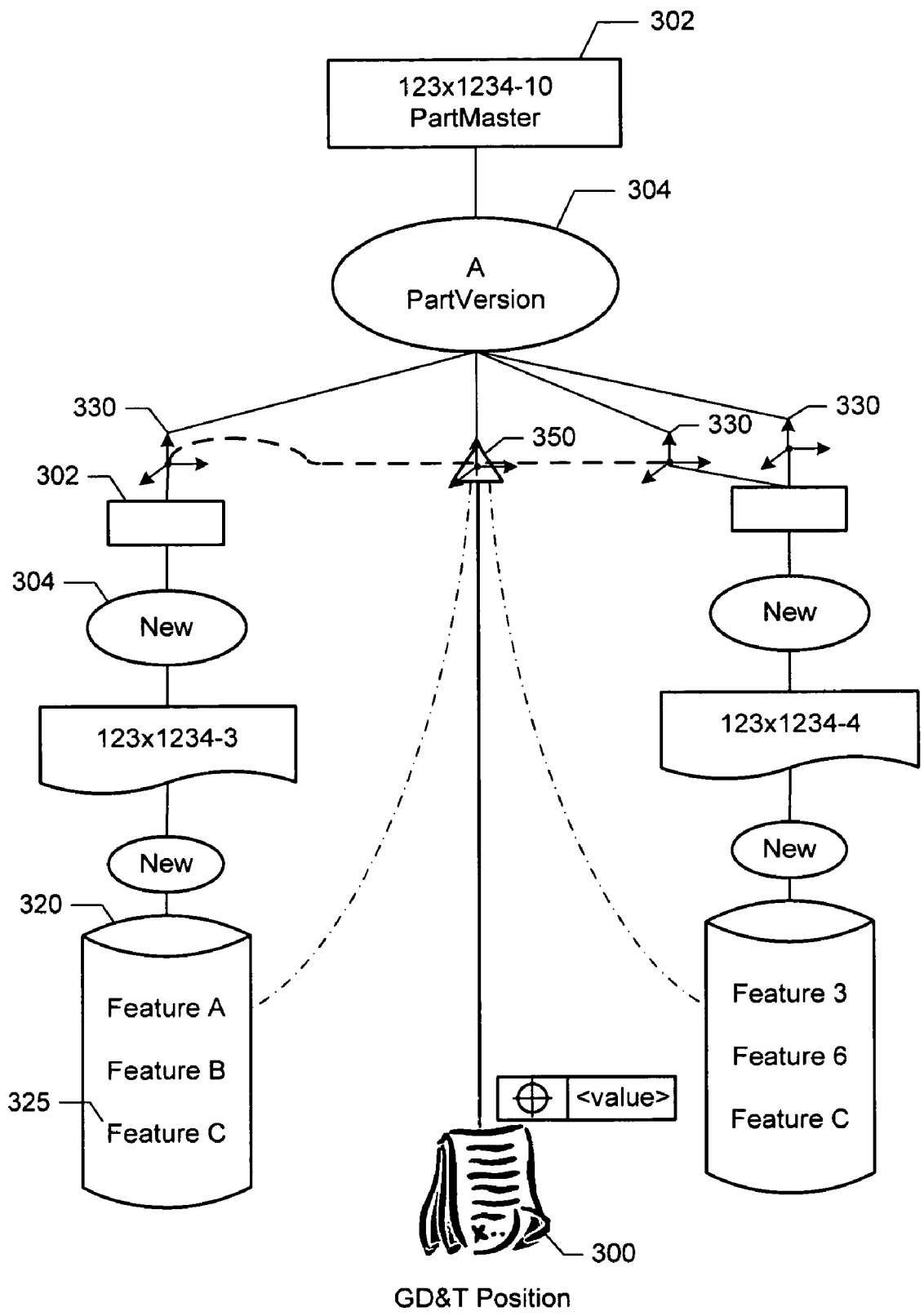
Figure 3C:
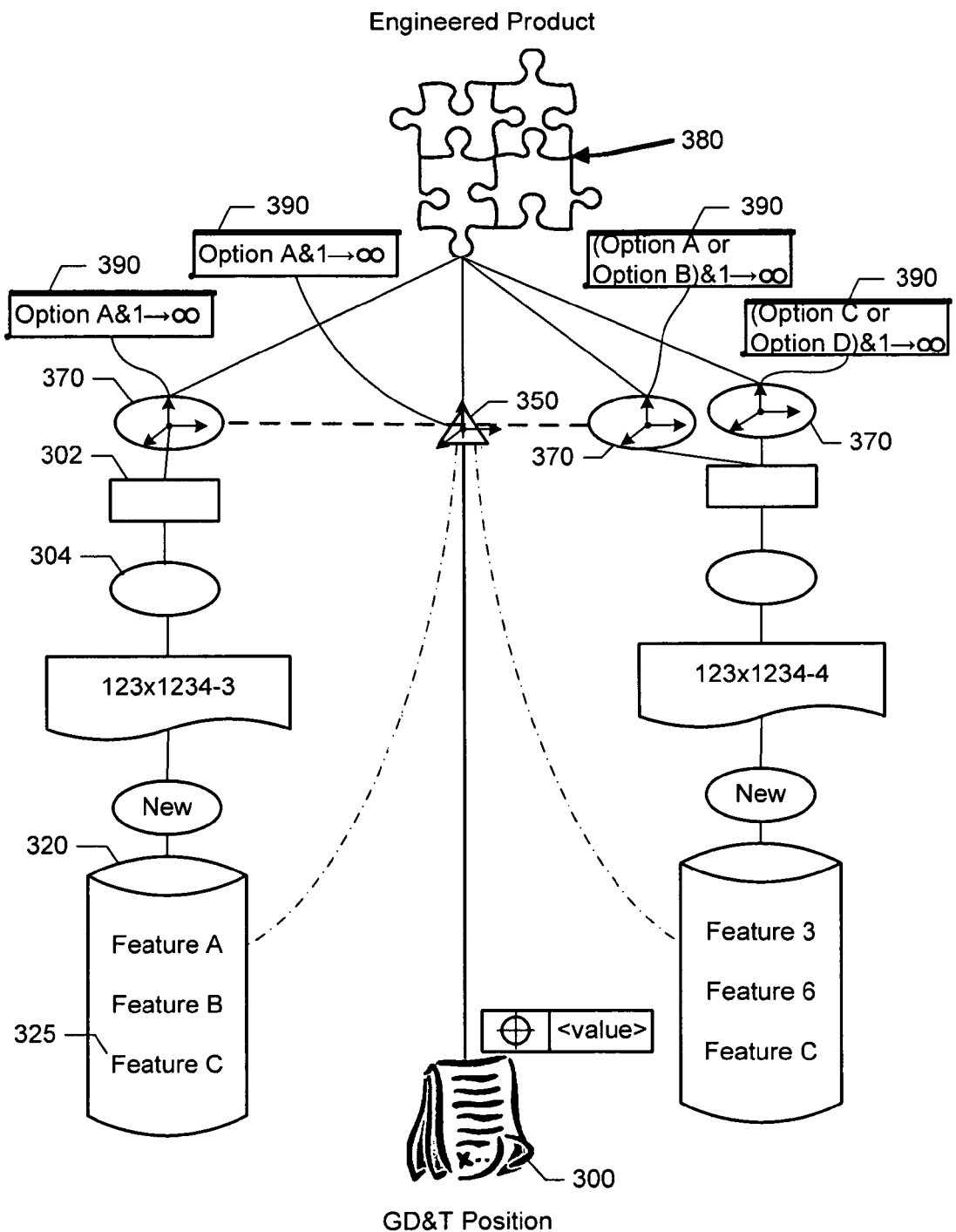

FIGS. 3A through 3C are schematic views of a set of engineering requirement callouts for detail structures, assembly structures, and product structures, respectively, in accordance with alternate embodiments herein. As shown in FIG. 3A, Engineering Requirement Callouts may be applied to the definition of an individual part.

An Engineering Requirement Callout is an electronic callout of an Engineering Requirement that defines the use of a requirement on a product. An Engineering Requirement Callout on a product is controlled by an applicability statement. An Engineering Requirement Callout is linked to an Engineering Requirement, and optionally, features of the 3 D design. An Engineering Requirement Callout is available to be linked to a process to be fulfilled in the manufacturing of the product. Engineering Requirement Callouts provide a method allowing accountability of the requirement callout for manufacturing consumption. Engineering Requirement Callouts may advantageously enrich the engineering design, as described more fully below.

For example, in the embodiment shown in FIG. 3A, the part is composed of a Part Master 302, Part Version 304, associated Document Master 312, Document Version 314, and the Geometry 320. The Geometry 320 may be composed of Features 325 (a surface, edge, fillet, etc. defining the shape of the part). Engineering Requirement Callouts at the part level 350, point to the Engineering Requirement 300, the Part Version 304, and optionally to Features 325 of the Geometry of the Part. These types of Engineering Requirement Callouts are considered part and parcel of the Part and are controlled by the Part Version (i.e., once the design is approved, you must create a new Part Version to change the Engineering Requirement Callout).

Engineering Requirement Callouts may be applied to the definition of an Assembly Part as shown on FIG. 3B. The Assembly Part is composed of a Part Master 302 and a Part Version 304. The Assembly Part Version is defined by the usage 330 of component Parts (each of which may be individual parts or sub-assemblies themselves). Engineering Requirement Callouts at the assembly level 350, point to the Engineering Requirement 300, usages 330 of the component parts, and to Features 325 of the Geometry 320 of the component parts. Engineering Requirement Callouts at the assembly level are considered part and parcel of the Assembly Part and are controlled by the Assembly Part Version (i.e., once the design is approved, you must create a new Assembly Part Version to change the Engineering Requirement Callout).

Engineering Requirement Callouts may be applied to the definition of the top level Product (a car, airplane, or toaster, for example) as shown on FIG. 3C. A Product is composed of Instances 370 of Parts (these could be either individual Parts or Assembly Parts). Engineering Requirement Callouts at the product level 350 point to the Engineering Requirement 300, Instances 370 of Parts, and optionally to Features 325 of the Geometry 320 of the instanced parts. Engineering Requirement Callouts at the product level are controlled by Applicability Statement 390. Applicability specifies conditions of when Instances and Engineering Requirement Callouts are valid on the Product. In FIG. 3C, the Engineering Requirement Callout 350 will be applied on units of the Product 380 built with Option A, for example.

Figure 7:
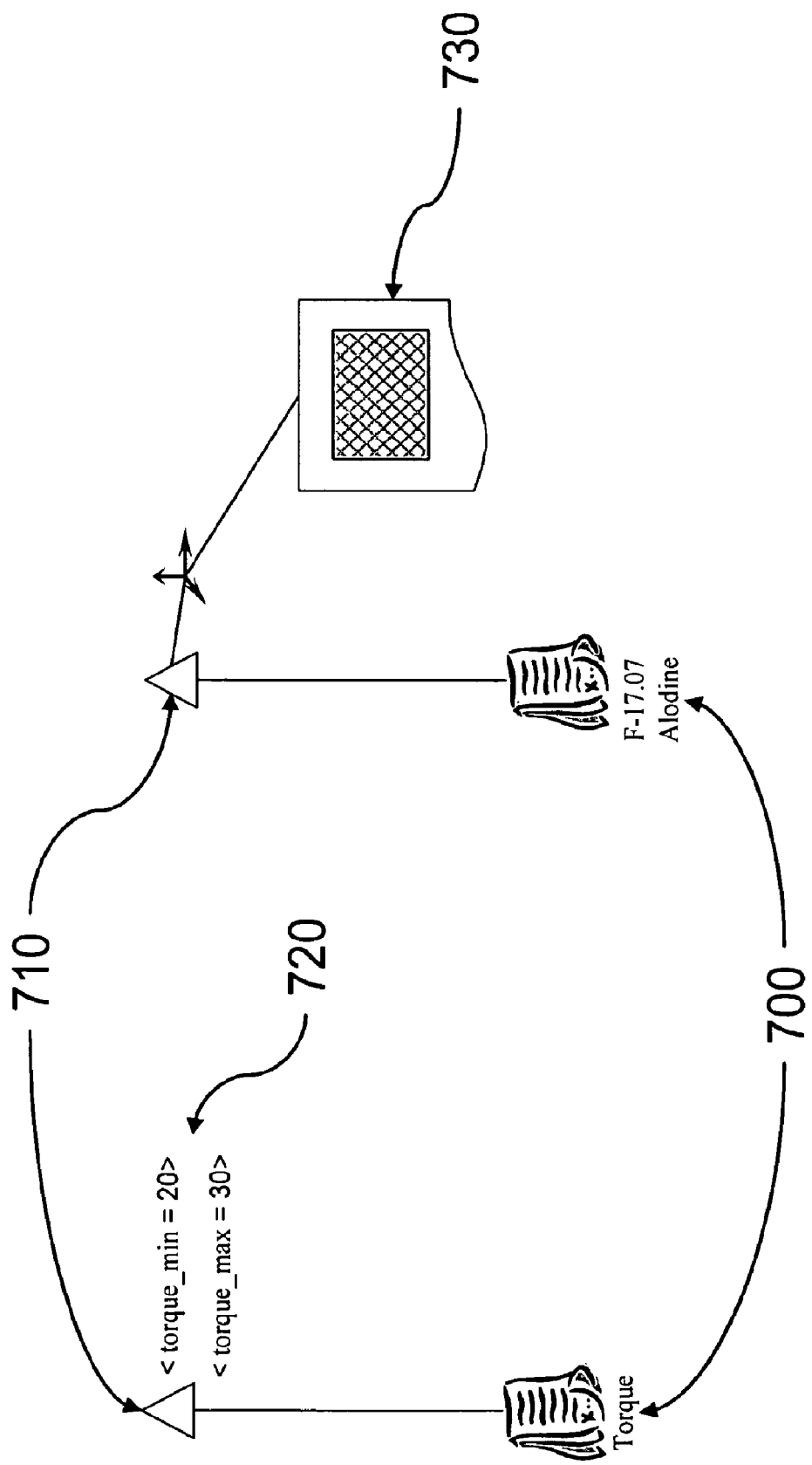
FIG. 7 is a schematic view of a set of engineering requirement callouts for additional features in accordance with another alternate embodiment herein.

Engineering Requirement Callouts defined at the individual part, assembly, or product level may also be qualified in several ways as depicted in FIG. 7. The Engineering Requirement Callout 710 may be spatially qualified by an attached Shape 730 defining the physical limits that the Engineering Requirement 700 is to affect. The Shape 730 may specify that the Alodine finish is only to be applied to a portion of a feature of the part for example. The Engineering Requirement Callout 710 may also be quantitatively qualified by Named Values 720. The Named Values 720 may specify the maximum and minimum torque values that must be applied to an instance of a fastener, for example.

Figure 4:
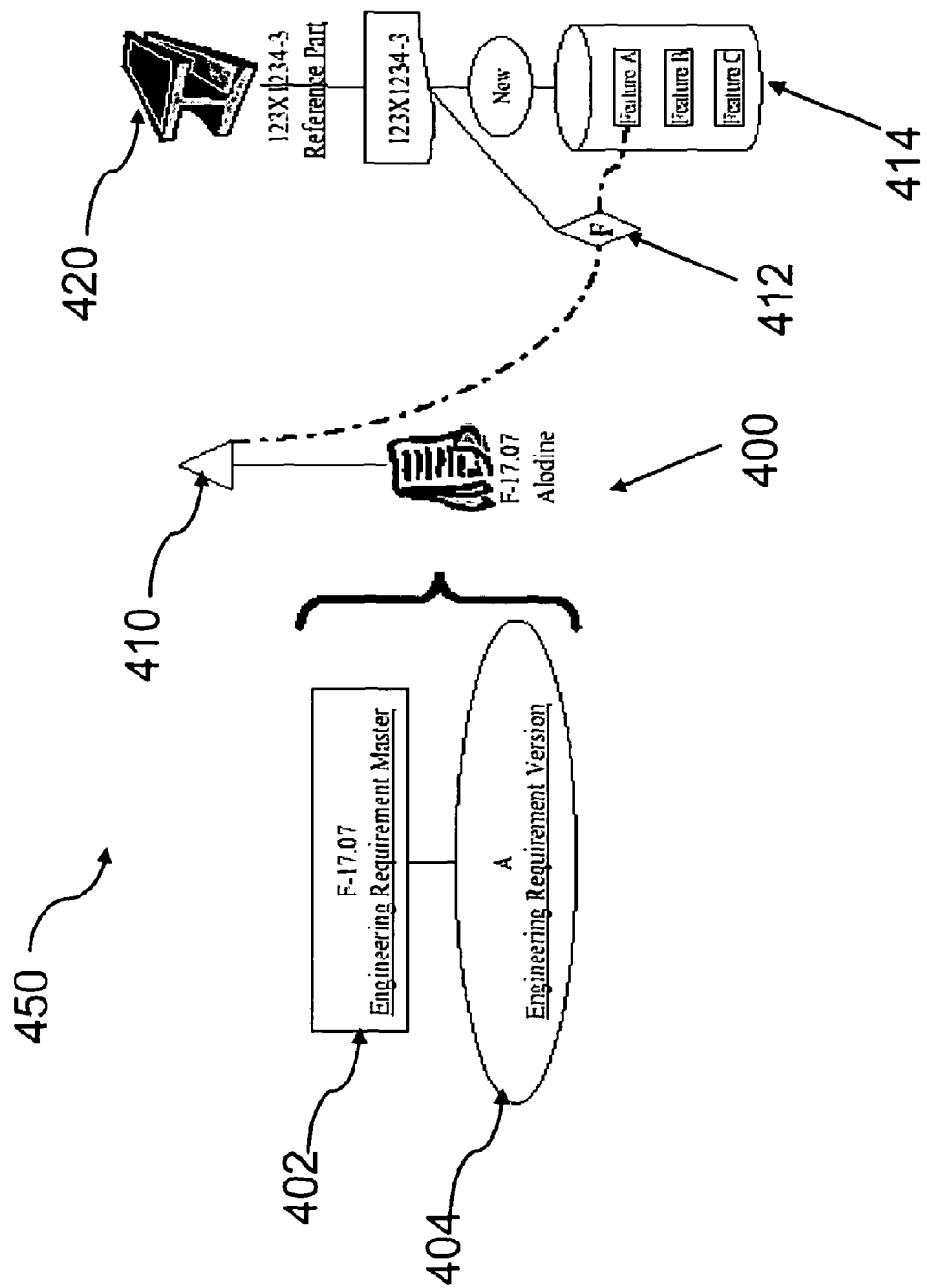
FIG. 4 is a schematic view of an electronic product definition including a set of electronic engineering intent requirements in accordance with yet another embodiment herein.

FIG. 4 is a schematic view of an electronic product definition 450 including a set of electronic engineering requirements 400 in accordance with yet another embodiment herein. The engineering requirements 400 include one master requirement 402, one or more version requirements 404, and a callout 410. In this embodiment, however, the callout 410 references a feature 412 or a set of features 414. The set of features 414 represent product characteristics or attributes that are independently addressable or selectable by an end-user during a product development phase. In one particular embodiment, the feature 412 supersedes any conflicting engineering requirements set forth in the master requirements 402 and the version requirements 404. Alternately, in another particular embodiment, selection of the various features 414 has no impact on, and does not conflict with, any of the other engineering requirements 402, 404 of the part 420. Therefore, a change to one of the features 414 of a part (or product) 420 will not affect the other engineering requirements that have been made to the part 420.

Figure 5:
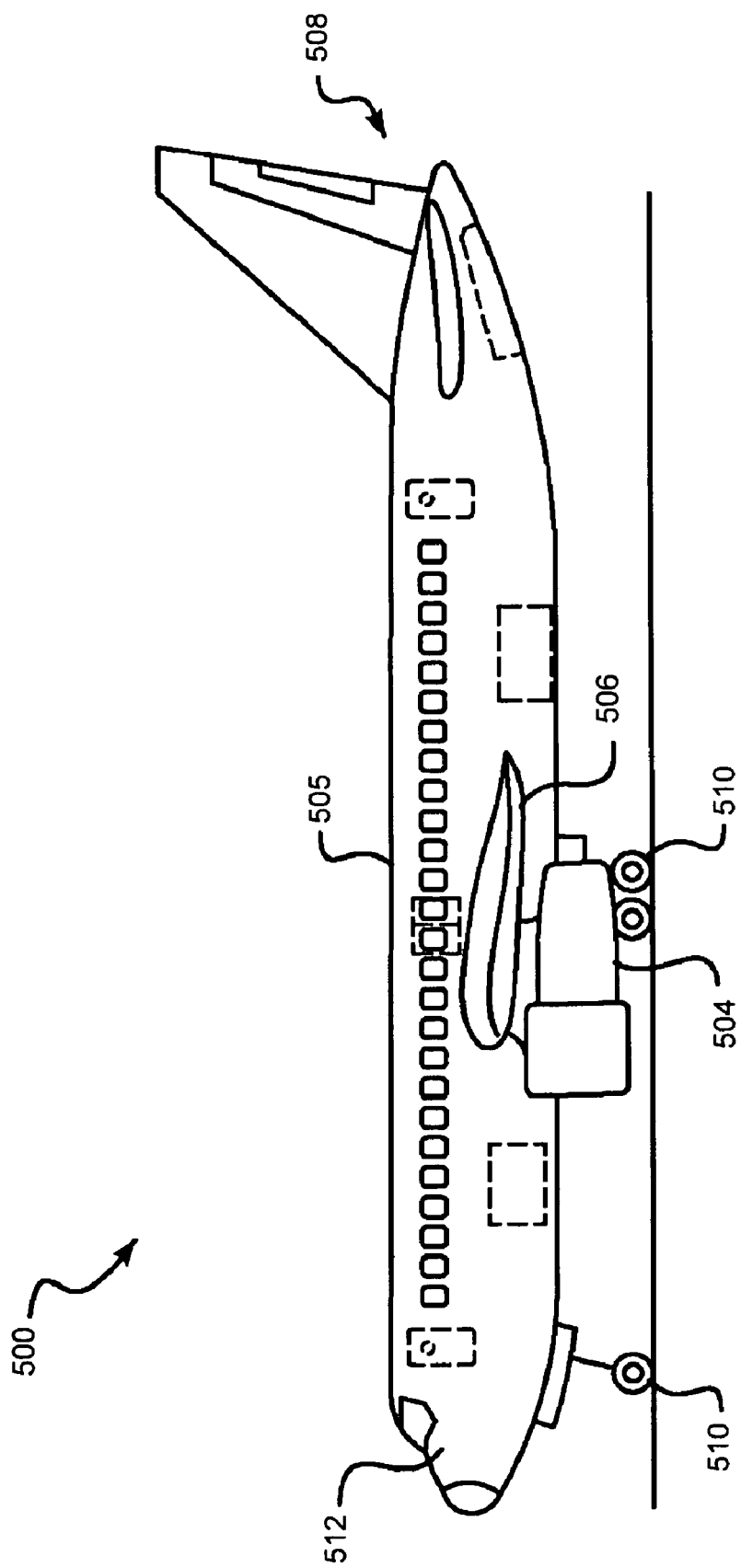
FIG. 5 is a side elevational view of an aircraft.

In a further embodiment, the electronic product definition 450 of FIG. 4 may represent that for a commercial aircraft. For example, FIG. 5 is a side elevational view of an aircraft 500 in accordance with an embodiment herein. The aircraft 500 includes one or more propulsion units 504 coupled to a fuselage 505, wing assemblies 506 (or other lifting surfaces), a tail assembly 508, a landing assembly 510, a control system 512 (not visible), and a host of other systems and subsystems that enable proper operation of the aircraft 500. The aircraft 500 shown in FIG. 5 is generally representative of a commercial passenger aircraft, including, for example, the 737, 747, 757, 767, and 777 models commercially-available from The Boeing Company of Chicago, Ill. The inventive methods disclosed herein, however, may also be employed in any other types of aircraft, such as rotary aircraft or manned military aircraft, including those described, for example, in The Illustrated Encyclopedia of Military Aircraft by Enzo Angelucci, published by Book Sales Publishers, September 2001.

Referring again to FIG. 4, in one representative embodiment, the product 450 may be the aircraft 500 of the type shown in FIG. 5, and the set of features 414 may be any of a multitude of various customer-defined options. For example, in one particular embodiment, the set of features 414 may be various types of interface features for aircraft engines, including, for example, those engines commercially-available from Rolls Royce, General Electric, and Pratt & Whitney. The callout 410 may therefore refer to the feature 412 that represents one particular engine interface feature selected by an end-user of the aircraft 500. In alternate embodiments, the features 414 may represent any of a wide variety of options that may be selected by the end-user, including airframe features, interior cabin features, cockpit features, weapons features, electronic surveillance features, or any other desirable product characteristics.

In some embodiments, a method herein may be used for product design. In other embodiments, a method herein may be used for processes downstream of design.

A computer may be used to perform a method herein.

Reference is now made to FIG. 8, which illustrates a computer 810 including a processing unit 820 and a computer-readable medium, such as memory 830. The memory 830 stores a program 840 that, when executed, causes the computer 810 to perform a method herein.

In some embodiments, the program 840 may be a standalone program. In other embodiments, the program 840 may be part of a larger program, such as a program for performing computer aided design.

Embodiments herein may advantageously provide engineering intent requirements in an electronic environment, including, for example, indicating characteristics of engineering requirements, objects, and relationships for the development and production of parts and products. Embodiments herein may advantageously provide engineering intent requirements in an electronic environment in an orderly and logical hierarchy, thereby providing efficient and flexible definition of engineering requirements for electronically-modeled products.

The invention claimed is:

1. A system comprising at least one computer for using electronic engineering intent requirements and callouts to create an electronic definition of an aircraft, the callouts linked to the electronic engineering intent requirements, the callouts configured to reference different feature options of the aircraft, the options being customer-selectable to specify different configurations of the aircraft, each of the callouts qualifying physical limits that the engineering intent requirement is to affect; wherein the callouts are used to identify any conflicts in the engineering intent requirements arising from a selected option.

2. The system of claim 1, wherein the engineering intent requirements convey constraints of an engineering design of the aircraft.

3. The system of claim 1, wherein at least one of the callouts is applied to a definition of a component part of the aircraft.

4. The system of claim 3, wherein at least one of the callouts is linked to features of a 3D design of the component part.

5. The system of claim 4, wherein at least one of the callouts links to an engineering requirement, a part version, and geometry features of the part.

6. The system of claim 1, wherein at least one of the callouts is applied to a definition of a part of the aircraft.

7. The system of claim 6, wherein at least one of the callouts links to an engineering requirement, usages of a plurality of component parts, and features of the component parts.

8. The system of claim 1, wherein the computer applies selected callouts to the electronic definition of the aircraft.

9. The system of claim 8, wherein at least one of the callouts links to an engineering requirement, instances of a plurality of component parts, and features and geometries of the instanced parts; and wherein a callout applied to the electronic product definition is controlled by applicability statements, which specify conditions of when instances and callouts are valid on the aircraft.

10. The system of claim 1, wherein the electronic engineering intent requirements includes a set of master requirements and a set of version requirements, and wherein the callouts are linked to the set of master requirements and the set of version requirements; and wherein the selected features supersede any conflicting engineering intent requirements set forth in the master and version requirements.

11. The system of claim 1, wherein at least one callout is linked to a particular requirement with a specific location relative to the selected option.

12. The system of claim 1, wherein at least one callout is linked to a particular requirement with a located shape.

13. The system of claim 1, wherein the feature options include options for at least one of different engines, airframe features, different interior cabin features, and different cockpit features.

14. The system of claim 1, wherein the feature options include options for at least one of different weapons features, and different electronic surveillance features.

15. The system of claim 1, wherein the feature options include options for different parts and assemblies of the aircraft.

* * * * *